US008638076B2

(12) United States Patent
Young (10) Patent No.: US 8,638,076 B2
(45) Date of Patent: Jan. 28, 2014

(54) TRANSIENT PROCESSING MECHANISM FOR POWER CONVERTERS

(75) Inventor: Chris M. Young, Austin, TX (US)

(73) Assignee: Intersil Americas Inc., Milpitas, CA (US)

( * ) Notice: Subject to any disclaimer, the term of this patent is extended or adjusted under 35 U.S.C. 154(b) by 670 days.

(21) Appl. No.: 12/604,812

(22) Filed: Oct. 23, 2009

(65) Prior Publication Data

US 2010/0102785 A1 Apr. 29, 2010

Related U.S. Application Data

(60) Provisional application No. 61/107,927, filed on Oct. 23, 2008.

(51) Int. Cl.
*G05F 1/00* (2006.01)
(52) U.S. Cl.
USPC ............................ 323/282; 323/283; 323/285
(58) Field of Classification Search
USPC .......................................... 323/282–285, 290
See application file for complete search history.

(56) References Cited

U.S. PATENT DOCUMENTS

| | | | |
|---|---|---|---|
| 4,028,501 A | 6/1977 | Rittenhouse | |
| 4,468,924 A | 9/1984 | Moore et al. | |
| 4,630,220 A | 12/1986 | Peckinpaugh | |
| 5,121,315 A | 6/1992 | Moriya et al. | |
| 5,237,208 A | 8/1993 | Tominaga et al. | |
| 5,479,090 A * | 12/1995 | Schultz | 323/284 |
| 5,506,493 A | 4/1996 | Stengel | |
| 5,661,625 A | 8/1997 | Yang | |
| 5,726,849 A | 3/1998 | Nakamura | |
| 5,742,151 A | 4/1998 | Hwang | |
| 5,747,977 A | 5/1998 | Hwang | |
| 5,761,895 A | 6/1998 | Chu et al. | |
| 5,768,117 A | 6/1998 | Takahashi et al. | |
| 5,770,940 A * | 6/1998 | Goder | 323/282 |
| 5,774,736 A | 6/1998 | Wright et al. | |
| 5,798,635 A | 8/1998 | Hwang et al. | |
| 5,822,204 A | 10/1998 | Yamada et al. | |
| 5,847,549 A | 12/1998 | Dodson, III | |
| 5,875,104 A | 2/1999 | Prager | |

(Continued)

FOREIGN PATENT DOCUMENTS

JP 10126235 5/1998

*Primary Examiner* — Adolf Berhane
*Assistant Examiner* — Yemane Mehari
(74) *Attorney, Agent, or Firm* — Meyertons, Hood, Kivlin, Kowert & Goetzel, P.C.; Jeffrey C. Hood (57) ABSTRACT

Hysteretic performance with fixed frequency may be achieved in controlling a power/voltage regulator, by adapting fixed frequency PWM (Pulse Width Modulation) to current-mode hysteretic control. In steady state, the current waveform may be inferred without having to measure the current. In current-mode control, the current may be adjusted proportional to the error voltage. The change in load current may be related to the change in duty-cycle, and the change in duty-cycle may be related to the error voltage, with the change in duty-cycle expressed as a function of the error voltage, to establish current-mode control. This current-mode control may be adapted to perform current-mode hysteretic, if instead of duty-cycle, the same duty-cycle or current shift was effected by a change in phase. A fraction of ripple current (Forc) may be defined as a specified fraction of the peak-to-peak ripple current, establishing a linear relationship between the Forc and the ripple current.

20 Claims, 10 Drawing Sheets

(56) References Cited

U.S. PATENT DOCUMENTS

| | | | |
|---|---|---|---|
| 5,935,252 A | 8/1999 | Berglund et al. | |
| 6,009,000 A | 12/1999 | Siri | |
| 6,157,222 A | 12/2000 | Yaklin | |
| 6,175,218 B1 | 1/2001 | Choi et al. | |
| 6,219,262 B1 | 4/2001 | Burgyan | |
| 6,219,623 B1 | 4/2001 | Wills | |
| 6,320,363 B1 * | 11/2001 | Oglesbee et al. | 323/303 |
| 6,359,426 B1 | 3/2002 | Sarles et al. | |
| 6,421,259 B1 | 7/2002 | Brooks et al. | |
| 6,456,157 B1 | 9/2002 | Forbes et al. | |
| 6,552,919 B1 | 4/2003 | Bors | |
| 6,674,672 B2 | 1/2004 | Forbes et al. | |
| 6,724,175 B1 | 4/2004 | Matsuda et al. | |
| 6,788,035 B2 | 9/2004 | Bassett et al. | |
| 6,795,009 B2 | 9/2004 | Duffy et al. | |
| 6,810,339 B2 | 10/2004 | Wills | |
| 6,822,426 B1 | 11/2004 | Todd et al. | |
| 6,949,916 B2 | 9/2005 | Chapuis | |
| 7,000,125 B2 | 2/2006 | Chapuis et al. | |
| 7,017,060 B2 | 3/2006 | Therien et al. | |
| 7,026,798 B2 | 4/2006 | Cheung et al. | |
| 7,045,915 B2 | 5/2006 | Otani et al. | |
| 7,049,798 B2 | 5/2006 | Chapuis et al. | |
| 7,050,863 B2 | 5/2006 | Mehta et al. | |
| 7,088,141 B2 | 8/2006 | Deogun et al. | |
| 7,099,164 B2 | 8/2006 | Zhu et al. | |
| 7,127,220 B2 | 10/2006 | Abrams et al. | |
| 7,149,098 B1 | 12/2006 | Chen | |
| 7,151,362 B1 | 12/2006 | Siri | |
| 7,180,274 B2 * | 2/2007 | Chen et al. | 323/222 |
| 7,239,257 B1 | 7/2007 | Alexander et al. | |
| 7,340,224 B2 | 3/2008 | Marsili | |
| 7,372,682 B2 | 5/2008 | Chapuis | |
| 7,376,472 B2 | 5/2008 | Wojsznis et al. | |
| 7,394,445 B2 | 7/2008 | Chapuis et al. | |
| 7,409,315 B2 | 8/2008 | Kim et al. | |
| 7,423,852 B2 | 9/2008 | Byers | |
| 7,446,430 B2 | 11/2008 | Leung et al. | |
| 7,456,617 B2 | 11/2008 | Chapuis et al. | |
| 7,506,179 B2 | 3/2009 | Templeton | |
| 7,522,429 B2 * | 4/2009 | Usui | 363/16 |
| 7,555,092 B2 | 6/2009 | Russell et al. | |
| 2002/0024378 A1 | 2/2002 | Forbes et al. | |
| 2003/0223253 A1 | 12/2003 | Chen et al. | |
| 2004/0051383 A1 | 3/2004 | Clark et al. | |
| 2004/0052098 A1 | 3/2004 | Burstein et al. | |
| 2004/0245970 A1 | 12/2004 | Todd et al. | |
| 2004/0246754 A1 | 12/2004 | Chapuis | |
| 2004/0263139 A1 | 12/2004 | Goto et al. | |
| 2005/0073783 A1 | 4/2005 | Luo et al. | |
| 2005/0180181 A1 | 8/2005 | Gaudreau et al. | |
| 2005/0243491 A1 | 11/2005 | Tanis | |
| 2005/0289378 A1 | 12/2005 | Vorenkamp et al. | |
| 2005/0289489 A1 | 12/2005 | Kim et al. | |
| 2006/0043955 A1 | 3/2006 | Hung | |
| 2006/0055574 A1 | 3/2006 | Maksimovic et al. | |
| 2006/0061976 A1 | 3/2006 | Belson et al. | |
| 2006/0114700 A1 | 6/2006 | Durbaum et al. | |
| 2006/0151219 A1 | 7/2006 | Khan et al. | |
| 2006/0212138 A1 | 9/2006 | Zhang | |
| 2006/0279891 A1 | 12/2006 | Dieffenderfer et al. | |
| 2006/0291258 A1 | 12/2006 | Zhu et al. | |
| 2008/0197826 A1 | 8/2008 | Schiff et al. | |
| 2008/0222493 A1 | 9/2008 | Fediakine et al. | |
| 2009/0091191 A1 | 4/2009 | Tomioka et al. | |
| 2009/0222136 A1 | 9/2009 | Lou | |
| 2010/0085024 A1 | 4/2010 | Houston et al. | |

* cited by examiner

$I_{RPPK} = I_{ripple\text{-}peak} - I_{ripple\text{-}valley}$

Cc – current count of the counter
Cp – target count
St – phase shift required
Ss – net phase shift

TRANSIENT PROCESSING MECHANISM FOR POWER CONVERTERS

PRIORITY CLAIM

This application claims benefit of priority of provisional application Ser. No. 61/107,927 titled "Transient Processing Mechanism for Power Converters", whose inventor is Chris M. Young, and which was filed Oct. 23, 2008, and is hereby incorporated by reference as though fully and completely set forth herein.

FIELD OF THE INVENTION

This invention relates to power converters and, more particularly, to transient processing in power converters.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims.

Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

The rapid evolution and increased power consumption of commercial integrated circuits, such as microprocessors and graphics processors, has created new and significant problems in delivery of the power to and removal of waste heat from these ICs. The power source must be capable of delivering very fast current transients. The electronic path to these loads must also have low resistance and inductance (a 1.5V supply would be completely dropped across a 25 mΩ resistance at 60 Amps). Traditionally, DC power supplies were designed to convert AC line voltage to one or more DC outputs that would be routed throughout a system to the points of load (POL). However, it may not be practical to route high-current signals throughout a system. To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA.

In many power distribution systems it is typically not enough to just distribute power around a system to the various POLs. Complex electronic systems are generally monitored and controlled to ensure maximum reliability and performance. Functions (power supply features) typically implemented in DPA systems include supply sequencing, hot swap ability, ramp control, voltage programming, load monitoring, tracking, temperature monitoring, fan speed control, phase control, current sharing, switching frequency programmability, and switching clock synchronization, to name a few. There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement glue-logic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system. In an effort to tie all or most of these functions together at the system level, one approach has been to implement the functions in control ICs responsible for controlling respective POL converters. Some of the functionality may also be programmed into a microcontroller that may communicate with attached POL converters over an I2C (inter-IC communication) bus to coordinate control of all POL converters in the system.

Figure 1:
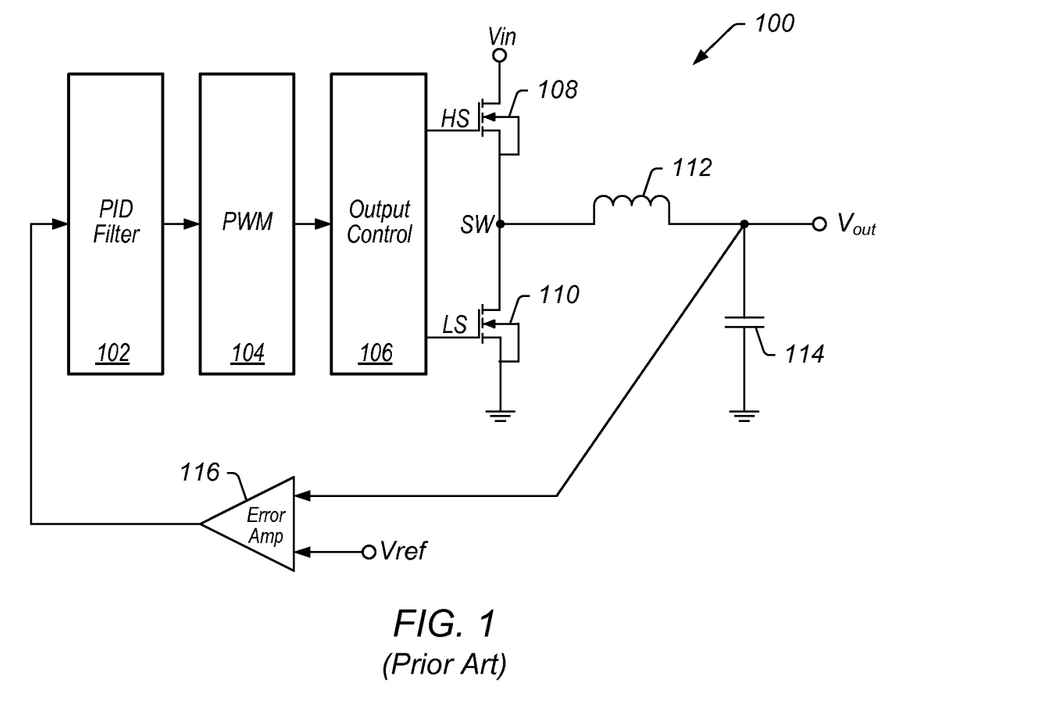
FIG. 1 shows a prior art power regulator.

DC-to-DC conversion is often performed by switching power regulators, or step-down regulators, converting a higher voltage (e.g. 12V) to a lower value as required by one or more load devices. A common architecture features distribution of the higher voltage to multiple power regulators, each producing a different (or possibly the same) voltage to one or more loads. Switching power regulators often use two or more power transistors to convert energy at one voltage to another voltage. One common example of such a power regulator 100, commonly called a "Buck Regulator" is shown in FIG. 1. Buck Regulator 100 typically switches a pair of power transistors (108 and 110) in order to produce a square-wave at the transistors' common node SW. The produced square-wave can be smoothed out using an LC circuit comprising inductor 112 and capacitor 114 to produce the desired voltage, $V_{out}$. A control loop, comprised of an Error Amplifier 116, a Proportional-Integral-Differential (PID) Filter 102, a Pulse-Width-Modulator (PWM) 104, and an Output Control circuit 106, can be configured to control the duty-cycle of the output square-wave, and hence the resulting value of $V_{out}$.

Power regulators, such as power regulator 100 shown in FIG. 1, for example, usually include a mechanism for recovering from transient output voltage deviations. These short-term voltage deviations may be caused by a variety of control loop disturbances, such as target reference voltage changes, input bus voltage steps, and load current transients. Typically, signal-processing circuitry in the control loop of the power converter processes these voltage deviations. The recovery process implemented by the control loop is typically relatively slow, however. Overall, the factors most often considered in the design of reliable power regulators include transient response, stability of the output over a wide range, ease of use, and cost.

Hysteretic Control

Various embodiments are disclosed for achieving hysteretic performance with fixed frequency, by adapting a fixed frequency PWM (Pulse Width Modulation) to emulate current-mode hysteretic control. In steady state, the current waveform may be inferred without actually having to measure the current. In current-mode control, the current may be adjusted proportional to the error voltage. The change in load current may be related to the change in duty-cycle, and the change in duty-cycle may be related to the error voltage, with the change in duty-cycle expressed as a function of the error voltage, to establish current-mode control. This current-mode control may be adapted to emulate current-mode hysteretic, if instead of duty-cycle, the same duty-cycle or current shift is effected by a change in phase. A fraction of ripple current (Forc) may be defined as a specified fraction of the peak-to-peak ripple current, establishing a linear relationship between the Forc and the ripple current.

For a given inductor and capacitor combination, ripple current may be known given the input voltage, output voltage, switching frequency, and to a lesser extent losses in steady state. In conventional PWM, which is typically configured with a fixed duty-cycle, a change in the duty-cycle (e.g. at the beginning of a cycle and for each subsequent pulse) typically leads to a slow change (i.e. spanning several cycles) in the inductor current, thereby slowly adjusting the output voltage. The current may rise or fall each cycle until steady state is achieved. The duty-cycle being proportional to the error voltage may therefore indicate a current proportional to the integral of the error voltage, and the value of the duty-cycle may not be the correct value for the target (reference) voltage. Consequently, the duty-cycle may need to be adjusted to the correct value at some point. Thus, by applying an instantaneous change of the phase while keeping the same duty-cycle after the phase change, a change in the current during the phase change may be obtained. The current may increment or decrement in the immediate cycle. For a phase shift proportional to the error voltage, the current may be proportional to the error voltage, and following the phase shift the duty-cycle may have the correct value for the target voltage.

Hysteretic control, sometimes referred to as ripple regulator control, is oftentimes used as a method for controlling the output of a power regulator, or voltage regulator (such as Buck regulator 100 in FIG. 1, for example). During hysteretic control, the converter output voltage is typically maintained within the hysteresis band centered around a reference voltage. A hysteretic-controlled regulator is widely used because of its inexpensive, simple and easy-to-use architecture. Some benefits of hysteretic control include a fast load transient response, and the elimination of the need for feedback-loop compensation. An additional characteristic of hysteretic control is the varying operating frequency. In other words, hysteretic control allows for simple system design without a need for external compensation, stable operation with a wide range of components, and extremely fast transient response. Hysteretic control may also provide high-efficiency operation, even at light loads.

Figure 2:
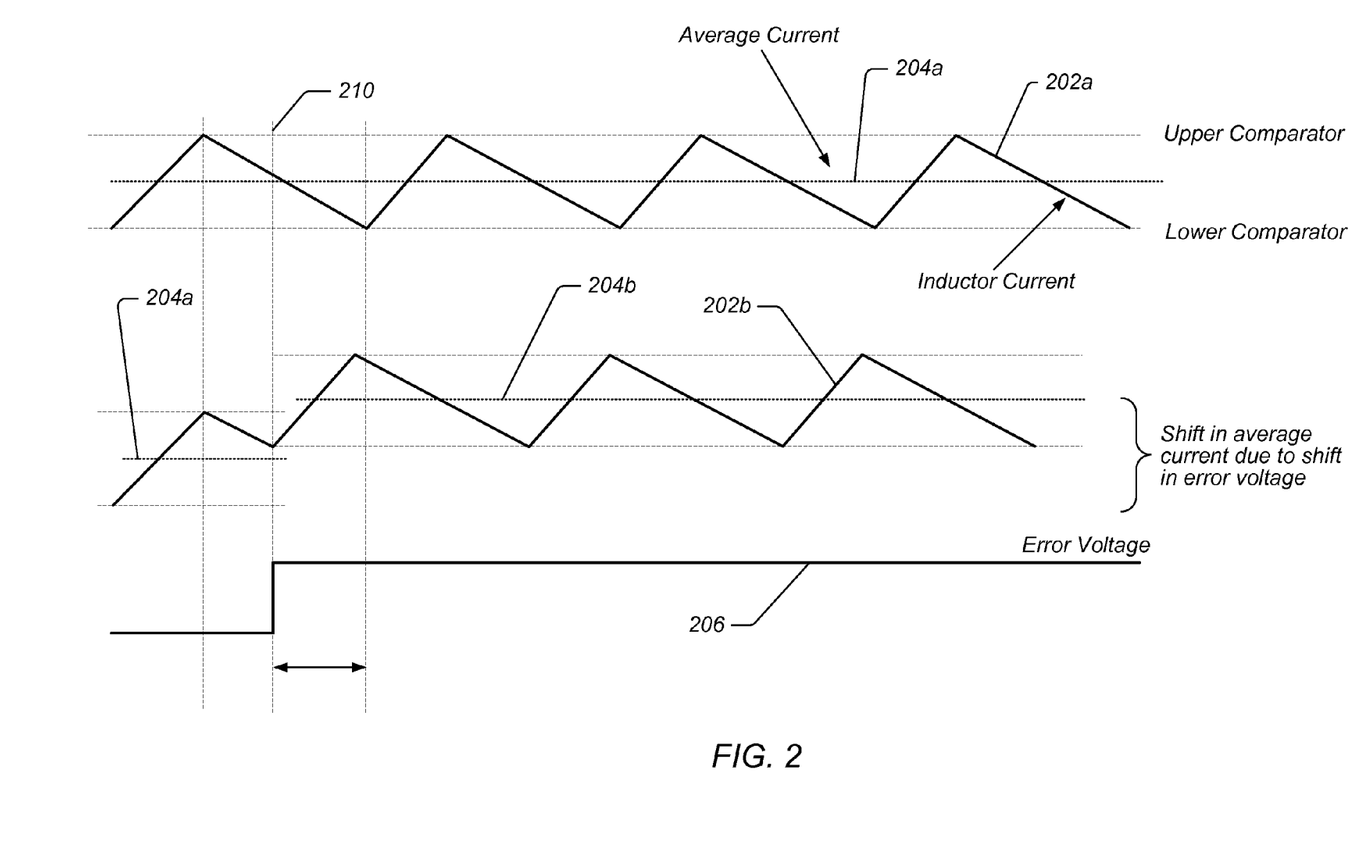
FIG. 2 shows a current/voltage diagram of the inductor ripple current and error voltage, according to one embodiment.

Conventional hysteretic control is essentially dependent on a measured ripple, which may be a voltage ripple or current ripple, as shown in FIG. 2. As shown in the three diagrams in FIG. 2, a step change in error voltage 206 may result in (or correspond to) a step change in current (from 202a to 202b), which may also result in (or correspond to) a step change in phase. Overall, a shift in the average current due to a shift in error voltage may be observed (from 204a to 204b). That is, the step change in error voltage 206 at time reference point 210 may result in a step change in inductor current 202a, which may be shifted up, shown as inductor current 202b. Consequently, there may a shift in average current, which may rise from a value indicated by 204a to a value indicated by 204b. Because of the variability in the signal to noise ratio for the ripple, hysteretic control may have certain disadvantages. Some of the issues associated with hysteretic control include variable performance depending on the noise, frequency jitter from cycle to cycle, and difficulty in performing control in multiphase operation where the voltage ripple is cancelled. However, hysteretic performance may be achieved without dependence on a ripple measurement, and with using a fixed frequency, by utilizing waveform knowledge gained from an established and understood steady-state behavior of the system.

Figure 3:
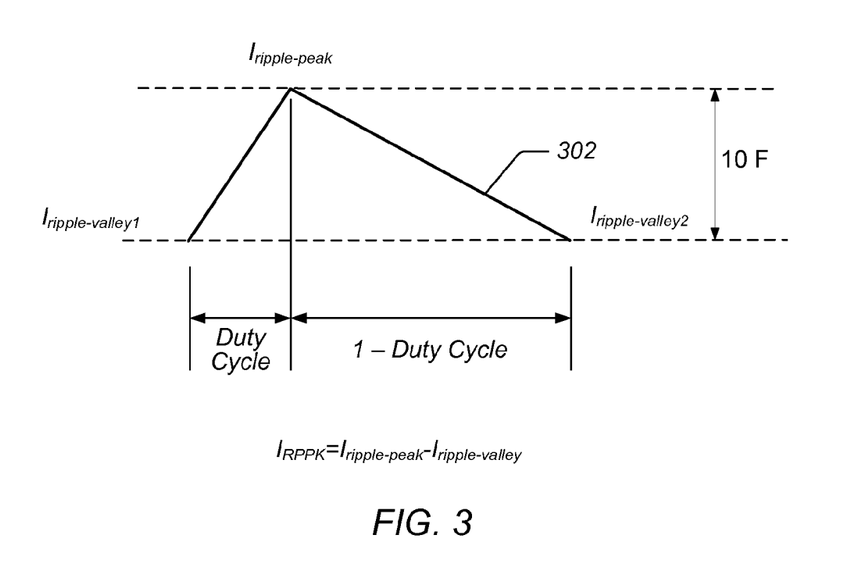
FIG. 3 shows one example of a current ripple waveform having a current ripple-valley, current ripple-peak, and duty-cycle.

In one set of embodiments, hysteretic performance may be achieved with fixed or quasi-fixed frequency, by adapting a fixed frequency PWM (Pulse Width Modulation) to current-mode hysteretic control. In one sense, in steady state, the current waveform may be inferred without having to measure the current, as the steady state behavior may be established based on various design and operating characteristics of the system. Therefore, a current-mode hysteretic control may be emulated without requiring the measurements normally associated with current-mode hysteretic control. Consequently, in current-mode control, the current may be adjusted proportional to the error voltage. FIG. 3 provides an example of a current ripple waveform 302, showing the current ripple-valley, current ripple-peak, and duty-cycle. During the up ramp (i.e. from $I_{ripple-valley1}$ to $I_{ripple-peak}$), the change in inductor current ($\Delta I_{inductor}$—e.g. in inductor 112 of regulator 100 of FIG. 1) may be expressed by the relationship:

$$\Delta I_{inductor} \approx \frac{(V_{in} - V_{out})}{Lf} \Delta D, \quad (1)$$

where $V_{in}$ represents the input voltage and $V_{out}$ represents the regulated output voltage (e.g. as shown in regulator 100 of FIG. 1), $\Delta D$ represents the change in duty-cycle, L represents the load inductance, and f represents the operating frequency. During the down ramp (i.e. from $I_{ripple\text{-}peak}$ to $I_{ripple\text{-}valley2}$), the change in inductor current may be expressed by the relationship:

$$\Delta I_{inductor} \approx \frac{-V_{out}}{Lf} \Delta D. \quad (2)$$

Therefore, the change in load current may be related to the change in duty-cycle, as expressed by:

$$|\Delta I_{inductor}| \propto |\Delta D|. \quad (3)$$

Consequently, the change in duty-cycle may be related to the error voltage, and $\Delta D$ may be expressed as a function of the error voltage:

$$\Delta D = f(V_{error}), \quad (4)$$

to establish current-mode control. This current-mode control may be adapted to perform current-mode hysteretic, if instead of duty-cycle, the same duty-cycle or current shift is effected by a change in phase. A fraction of ripple current (Forc) may be defined and expressed by:

$$\frac{(V_{in} - V_{out})}{Lf} \Delta D = -\frac{V_{out}}{Lf}(1-D) = Iripple_{Pk\text{-}Pk} = 10F, \quad (5)$$

where the peak-to-peak ripple current ($Iripple_{Pk\text{-}Pk}$) may be defined as 10 Forcs (or 10 fractions of ripple current), as shown in FIG. 3. Thus, a linear relationship may be established between the ripple current and Forc. In steady state, during the on time of the high side FET (e.g. FET 108 in FIG. 1), the current may go from the valley value to the peak value (both of which may be expressed in Amps) at a constant rate for a duration of D*f seconds. Similarly, the Forc may go from 0 Forcs to 10 Forcs at a constant rate for a duration of D*f seconds.

Figure 4:
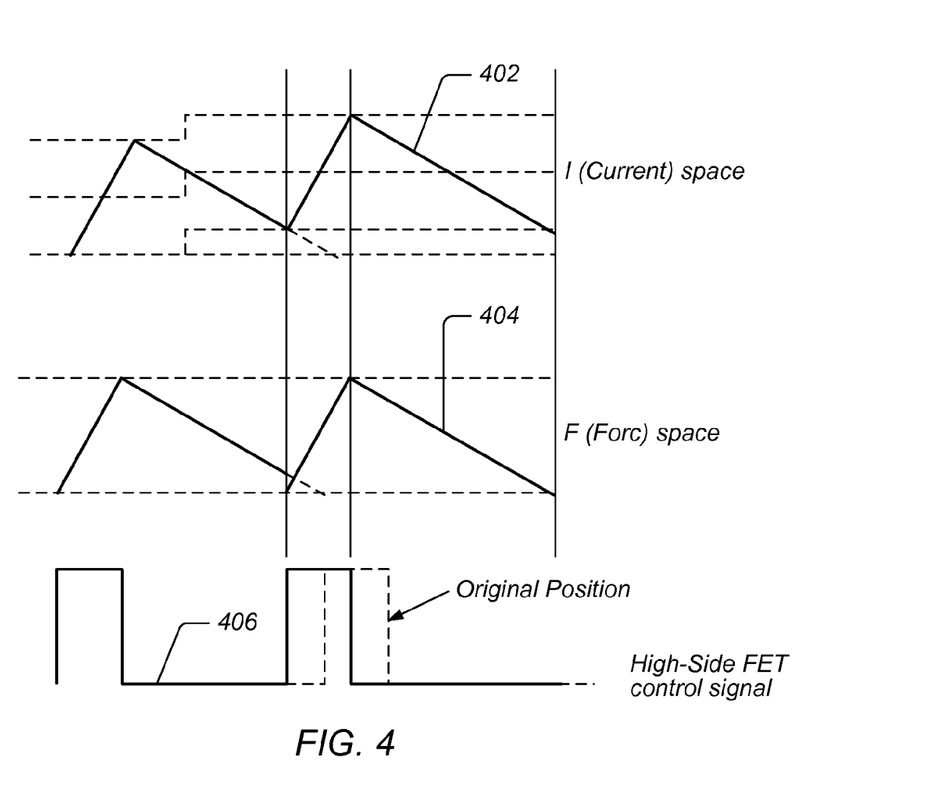
FIG. 4 shows waveforms for current space, Forc space, and high-side FET control signal, according to one embodiment.

The following section describes one embodiment of how normalization may be performed using a "Forc" controller. If the goal was to change the current in a hysteretic controller by a specified amount of current (e.g. 1 Amp) for each specified voltage step (e.g. 1 mV) in the error voltage, then for a ripple current (peak-to-peak ripple current $Iripple_{Pk\text{-}Pk}$) of 10 Amps, the current may be changed by one tenth of the ripple current for every 1 mV of error voltage. For example, the ripple current may go from maximum value to minimum value in a specified amount or period of time, e.g. 10 μsecs. For a 1 mV error, a window comparator may be shifted such that the center is 1 Amp away from the steady state value, as shown in the current space diagram in FIG. 4. The high-side FET control signal 406 (e.g. the HS control signal from output control block 106 to high-side FET 108 in regulator 100 of FIG. 1) may be shifted from its original position as shown. FIG. 4 also illustrates the relationship between the ripple current (space), represented by current function 402, and the Forc values (space), represented by function 404. Since in the example used, ripple current 402 may fall at a rate of 1 Amp/μsec, a 1 Amp shift upwards may effectively shift the phase 1 μsec earlier. In other words, the rate at which ripple current 402 falls may also be indicative of the time period by which the phase may be shifted (earlier) due to ripple current 402 shifting upward by the same rate at which ripple current 402 falls. Again, if the goal were to change the current in a "Forc" controller by 1 Amp for every 1 mV of error, then for a ripple current equivalent to 10 Forcs, a shift of 1 Forc would correspond to a shift of one tenth of the ripple current. However, in this implementation, there may be no need to shift a window comparator. Since ripple current 402 may fall at a specified rate, e.g. a rate of 1 Forc/μsec, a 1 Forc shift upwards may effectively shift the phase 1 μsec earlier. Therefore the phase may be shifted by 1 μsec, as illustrated by High-Side FET control signal 406 in FIG. 4.

Figure 5:
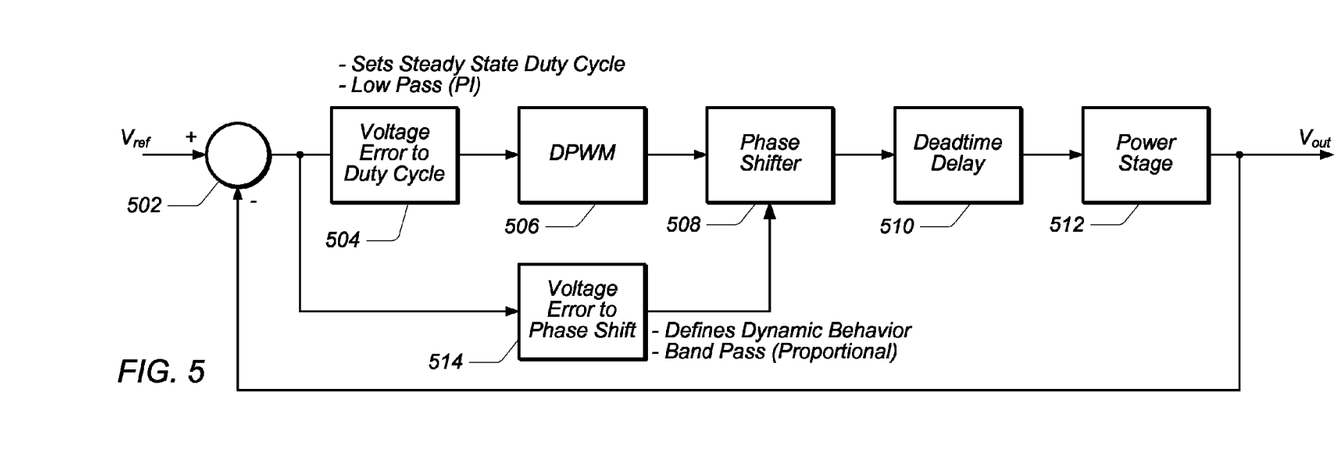
FIG. 5 shows a block diagram of a control path implementing a "Forc" controller.

FIG. 5 shows a block diagram of a control path implementing a "Forc" controller, as one possible alternative to the control path shown in FIG. 1. Power Stage 512 output may be compared to a reference voltage $V_{ref}$ (at 502), and the resulting voltage error signal may be used in voltage-error-to-duty-cycle block 504 to determine the duty-cycle, which may then be used in DPWM block 506 to control the DPWM signal, which may be the input to Phase Shifter 508. The output of Phase Shifter 508 may be used for generating the Deadtime Delay signals in Deadtime Delay block 510 to control Power Stage 512, and generate the desired voltage output $V_{out}$. The voltage error from summing block 502 may also be used by Voltage Error to Phase Shift block 514 to determine a phase shift, and provide a control signal to Phase Shifter 508, which may be used by Phase Shifter 508 to shift the DPWM control signal provided to Deadtime Delay block 510, thereby generating the final control signal for Power Stage 512. Overall, the PWM control loop (from Power Stage output 512 to the output of summing block 502) may be considered the main loop configured to control the output voltage of the Power Stage, with a secondary loop (a "Forc loop") from the output of node 502 to the Phase Shifter to control the transient behavior of the output of the Power Stage (i.e. to define the dynamic behavior of the power regulator). In other words, the main loop may operate to set the steady state duty-cycle, while the secondary loop (or Forc loop) may operate to define the dynamic behavior of the power regulator. It should also be noted that in at least one set of embodiments, Power Stage 512 may include high-side FET 108 and low-side FET 110 as shown in Buck Regulator 100, and may also include inductor 112 and capacitor 114.

Figure 6:
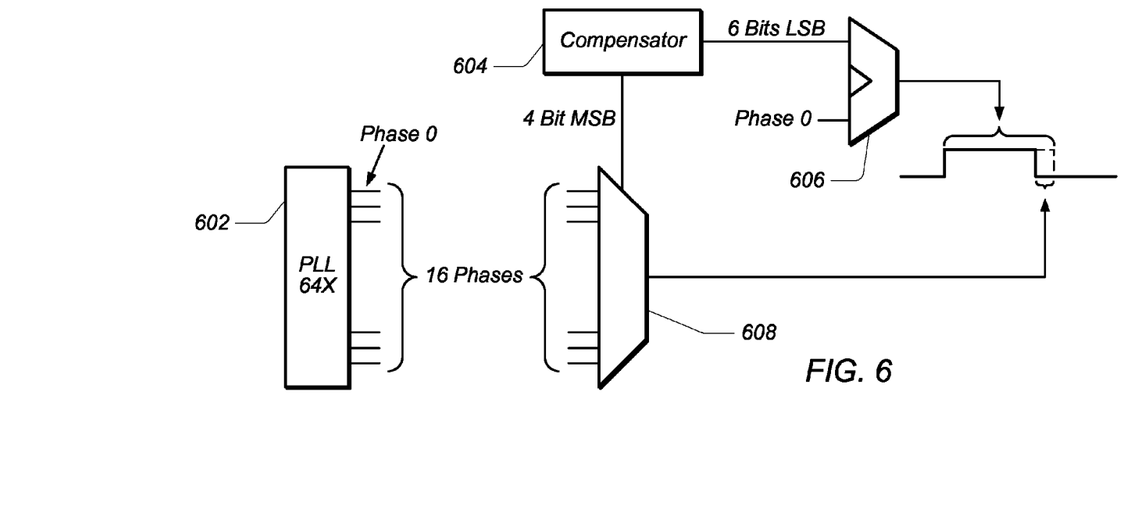
FIG. 6 shows one embodiment of the DPWM block of FIG. 5.

FIG. 6 shows one embodiment of the DPWM (digital pulse width modulation) block 506 of FIG. 5. In one set of embodiments, when generating a high resolution DPWM signal, compensator 604 may have a resolution of a specified number (N) of bits. In the embodiment shown in FIG. 6, N=10. The "word" formed by these N (10) bits may be translated into a pulse width corresponding to the generated PWM signal. In one embodiment, the least significant bits (LSB) may be handled with a 6-bit counter 606 running at a given clock frequency corresponding to the output (Phase 0) of a clock 602. In other words, a specified number (K) of bits comprising the K least significant bits of the N bits may be handled by counter 606, which may count on a clock having a specified frequency that corresponds to a phase 0 output of a clock having a specified frequency. Thus, counter 606 may determine the coarse resolution of the pulse-width. The most significant bits (MSB) may be handled by selecting a phase offset from clock 602, where the number of MSBs is N-K. The output of PLL 602 may have include a specified number (L) of lines (16 lines in the example shown), each line corresponding to a certain phase offset of clock 602. The MSBs of compensator 604 may select a particular phase by way of a multiplexer 608. Thus, one count duration of clock counter 606 may be divided into L time slices, and may allow the MSB part of the PWM word to resolve to a 1/L fraction of an LSB count value. Consequently, the fine resolution of the pulse width may be set by the MSB selection of the corresponding output of PLL 602.

For a given inductor and capacitor combination, for example a known combination of inductor 112 and capacitor 114 in power regulator 100 in FIG. 1, ripple current may be known given the input voltage Vin, output voltage $V_{out}$, frequency, and to a lesser extent losses in steady state. For small signal behavior, the loss portion may be neglected. This may typically be the case for both hysteretic control and conventional PWM control. In conventional PWM control (as exemplified in Buck regulator 100 in FIG. 1) configured with a fixed duty-cycle, when the duty-cycle is changed (e.g. at the beginning of a cycle and for each subsequent pulse), the inductor current may "slowly" change (i.e. over several cycles), and the output voltage may thereby "slowly" adjust. The current may increment or decrement each cycle until steady state occurs. If the duty-cycle is proportional to the error voltage, the current may be proportional to the integral of the error voltage. The duty-cycle may not have the correct value for the target (reference) voltage, and may therefore have to be adjusted back to the correct value at some point. An instantaneous change of the phase (while keeping the same duty-cycle after the phase change) may lead to the current changing during the phase change. The current may increment or decrement in the immediate cycle. If the phase shift is proportional to the error voltage, the current may be proportional to the error voltage, and following the phase shift, the duty-cycle may have the correct value for the target voltage.

In one set of embodiments, the input voltage may be specified to be 12 V, the output voltage may be specified to be 1.5 V, and the operating cycle (corresponding to the operating frequency) may be divided into 64 segments. A counter, e.g. an up/down counter may be used to determine/control the high-side FET, or more specifically to control the on/off time duration of the high-side FET (a FET corresponding to FET 108 of FIG. 1, for example). The error shift may be counted until the shift goal is attained. This may be achieved with a single gain parameter, where the up/down shift ratio may be proportional to the down/up ratio. Example values for the principal components in one embodiment may include a 0.45 µH for the inductor (an inductor corresponding to inductor 112 of FIG. 1, for example), 234 µF for the load capacitor (a capacitor corresponding to capacitor 114 of FIG. 1, for example), an operating frequency of 400 KHz, supporting a full load current of 16 A, and 25% and 50% transient. These values are provided as examples for one embodiment, and alternate embodiments may use other values determined as required by the given system specifications and desired performance.

Figure 7:
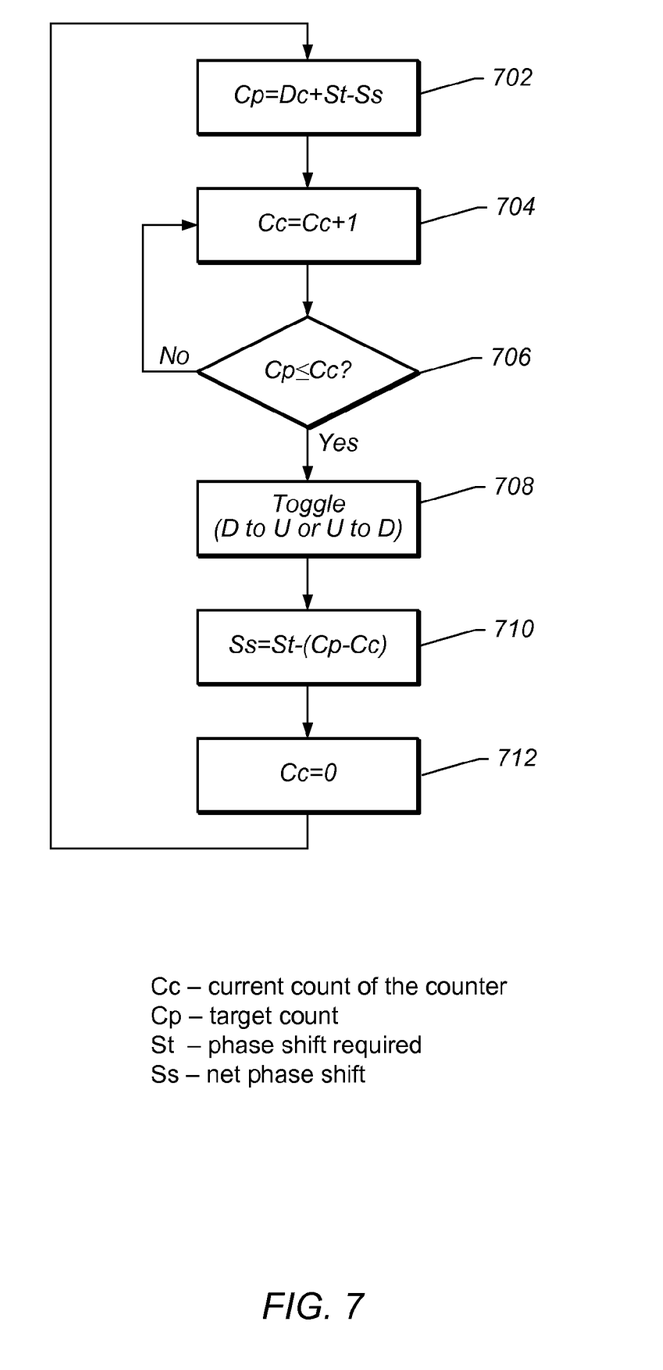
FIG. 7 shows a flow diagram illustrating the flow of operation of the error shift count according to one embodiment.

FIG. 7 shows a flow diagram capturing operation of the error shift count according to one embodiment. A target count value may be set to the sum of the duty-cycle, required phase shift, and net phase shift (702), and a current count of the counter may be incremented by a specified amount, where the specified amount is '1' in the embodiment shown (704). The target count value may then be compared to the current count value of the counter (706), and if the current count value is not greater than the target count value, then the current count may again be incremented by the specified amount (704). This may be performed until the current count is greater than the target count. When the current count is greater than the target count, the counter may toggle from up to down or down to up, depending on the current setting (708). The net phase shift may then be computed by subtracting the difference between the target count and current count from the required phase shift value (710). The current count may then be reset to its initial value, which may be '0' (712), the target count may be recomputed (702), and the counter may begin incrementing again (704).

Figure 8:
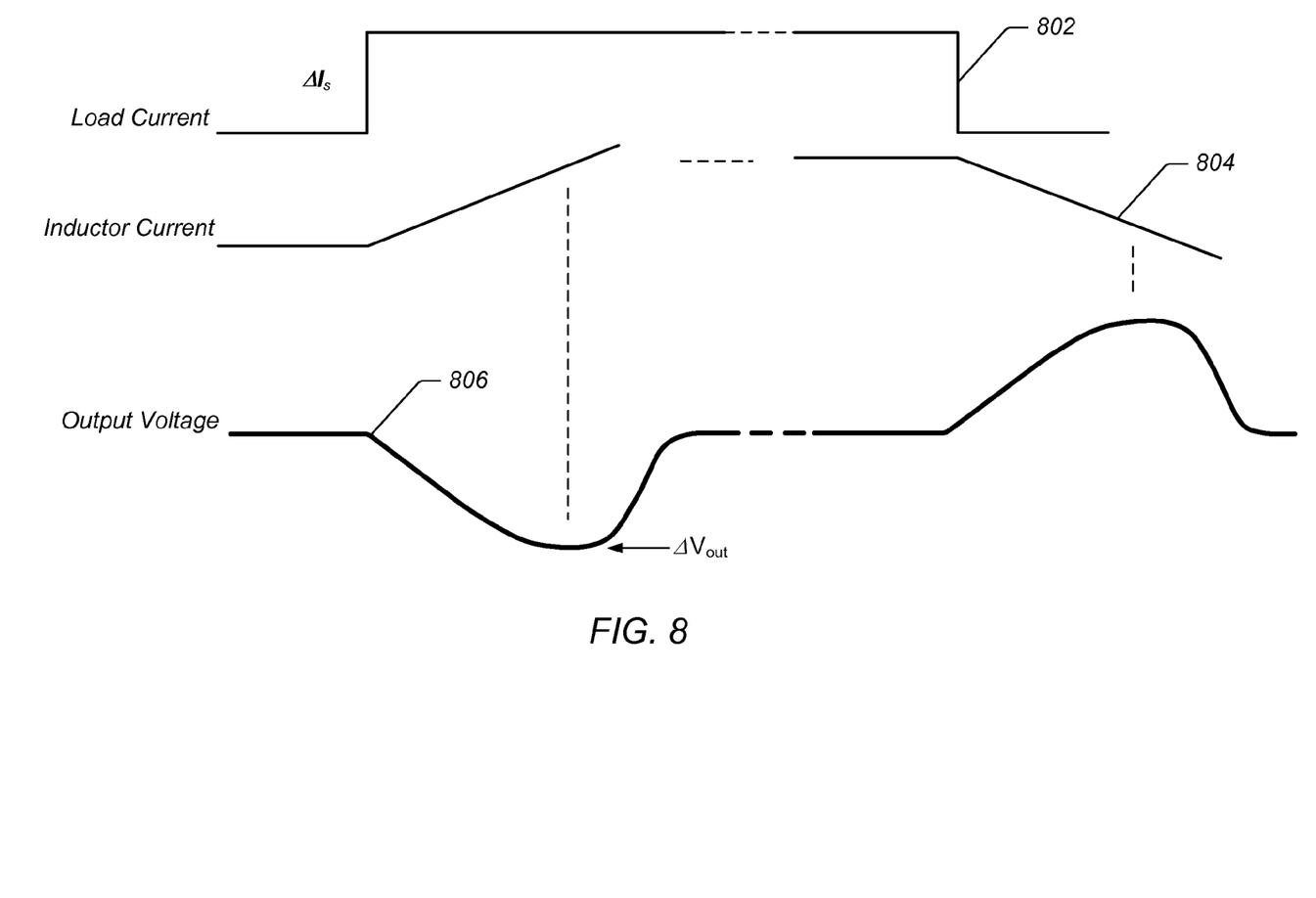
FIG. 8 shows a signal diagram for the step-load transients for load current, inductor current, and output voltage, according to one embodiment.

FIG. 8 is a signal diagram showing the step-load transients for load current 802, inductor current 804, and output voltage 806, according to one embodiment. The behavior illustrated in FIG. 8 corresponds to the inductor ramp (of the inductor current illustrated by waveform 804) starting ideally at the instant of the current step (of the load current illustrated by waveform 802), with no equivalent series resistance (ESR), no equivalent series inductance (ESL), and no DCR. Change in output voltage $\Delta V_{out}$ (shown as the "valley" in the output voltage response diagram in FIG. 8) may be expressed as:

$$\Delta V_{out} = \frac{(\Delta I_S + 0.5 * I_{peak\text{-}to\text{-}peak\text{-}ripple})^2 L}{2CV_L}, \quad (6)$$

where $V_L$ is the inductor voltage.

Figure 9:
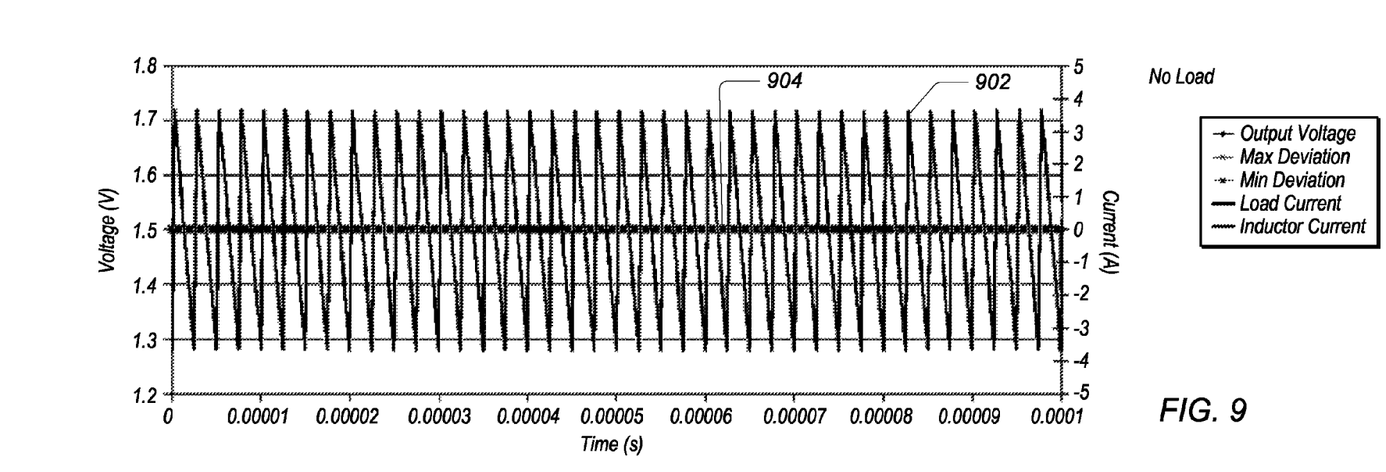
FIG. 9 shows a current diagram for the baseline, open loop response (for fixed duty-cycle) of a power regulator output without a load, according to one embodiment.
Figure 10:
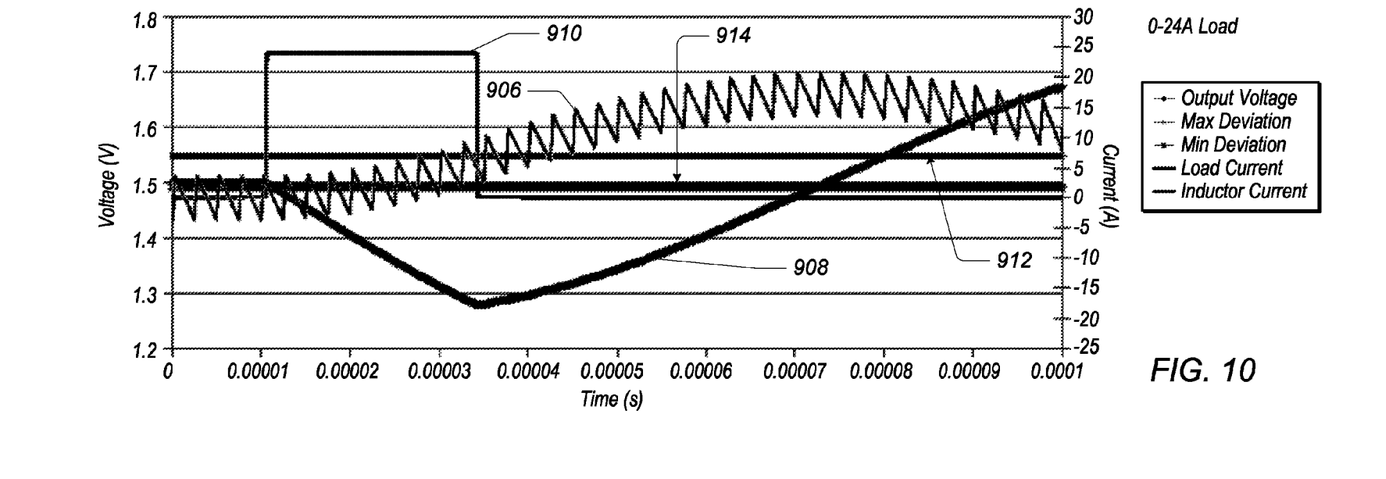
FIG. 10 shows a current/voltage diagram for the baseline, open loop response (for fixed duty-cycle) of a power regulator output with a load, according to one embodiment.
Figure 11:
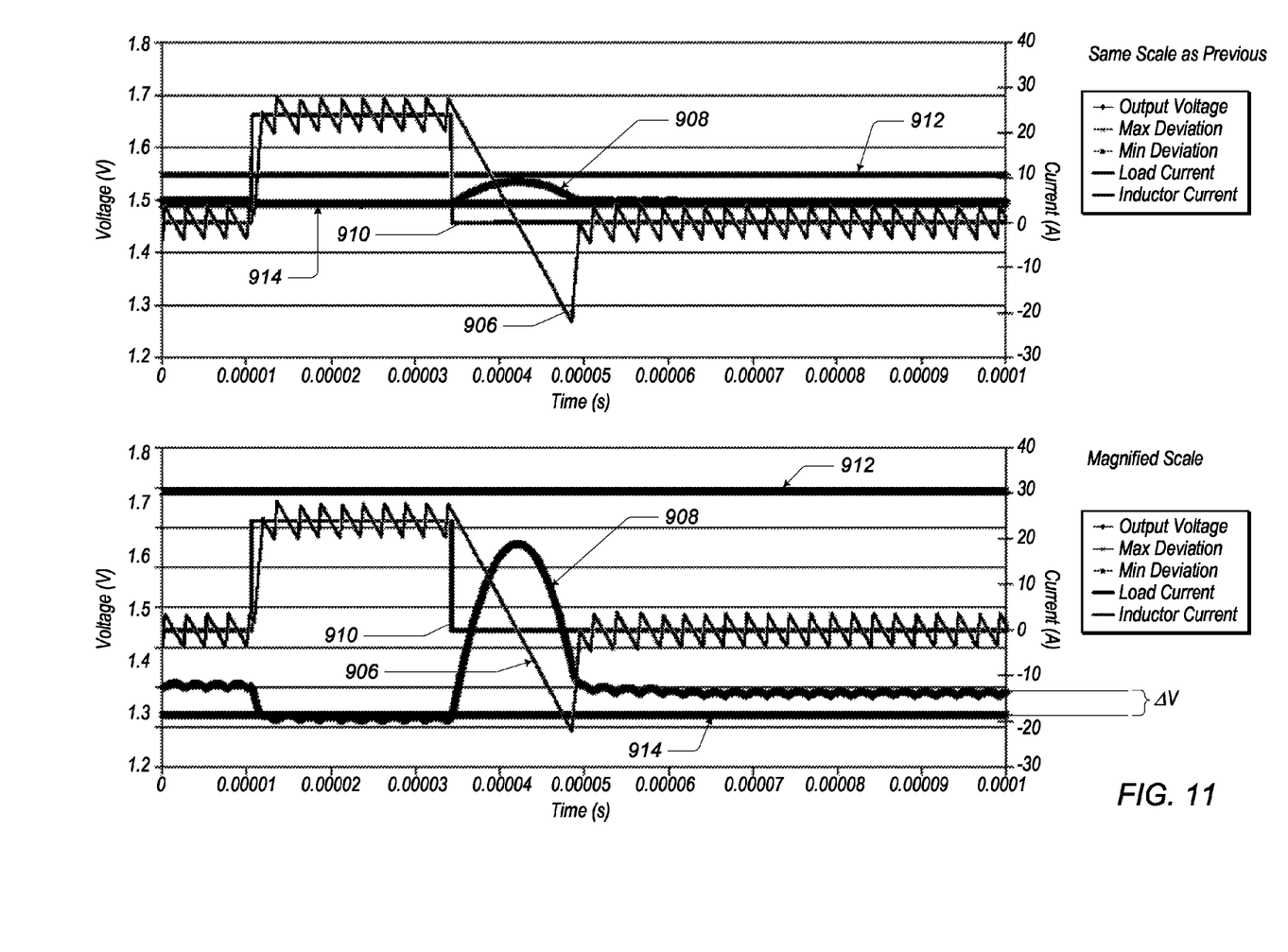
FIG. 11 shows a current/voltage diagram illustrating the transient response of the power regulator output when using a Forc controller, according to one embodiment.

FIG. 9 shows a current diagram for the baseline, open loop response (for fixed duty-cycle) of a power regulator output without a load, according to one embodiment. The load current is shown as waveform 904 (and is 0, as there is no load), and the inductor current is shown as waveform 902. FIG. 10 shows a current/voltage diagram for the baseline, open loop response (for fixed duty-cycle) of a power regulator output with a load that may draw from 0-24 Amp of current, according to one embodiment. The load current is shown as waveform 910, the inductor current is shown as waveform 906, the output voltage is shown as waveform 908, the maximum deviation is shown as waveform 912, and the minimum deviation is shown as waveform 914. FIG. 11 shows a current/voltage diagram illustrating the transient response of the power regulator output when using a Forc controller as previously described. The top diagram is presented at the same scale as the diagram in FIG. 10, while the bottom diagram is presented at a magnified scale to show detail. As with FIG. 10, the load current is shown as waveform 910, the inductor current is shown as waveform 906, the output voltage is shown as waveform 908, the maximum deviation is shown as waveform 912, and the minimum deviation is shown as waveform 914.

The load line voltage offset between the minimum deviation (waveform 914) and output voltage (waveform 908), shown as $\Delta V$ in FIG. 11, may be expressed as:

$$\Delta V = \frac{(I_{ripple:peak\text{-}to\text{-}peak})}{Gain} \Delta I_{Load}. \quad (7)$$

Figure 12:
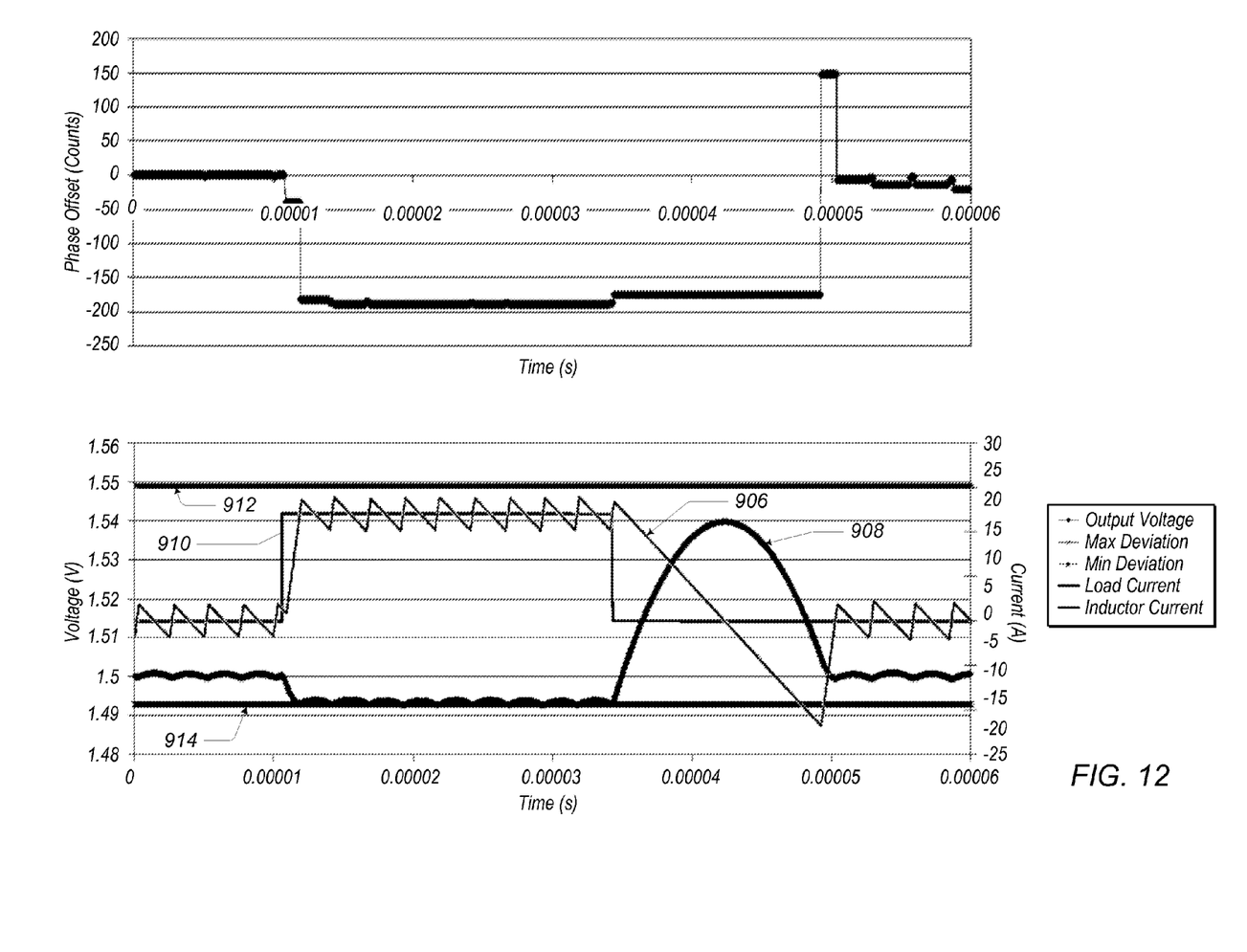
FIG. 12 shows diagrams for the phase offset plotted versus time, and the transient response of the power regulator output, to illustrate how the phase adjusts to the current step, according to one embodiment.

As shown in FIG. 12, the phase offset, shown in the top diagram in terms of count versus elapsed time, may adjust to the current step of the load current 910, as show in the bottom diagram, which again illustrates the transient response of the power regulator output when using a Forc controller, with the load current again shown as waveform 910, the inductor current shown as waveform 906, the output voltage shown as waveform 908, the maximum deviation shown as waveform 912, and the minimum deviation shown as waveform 914.

Figure 13:
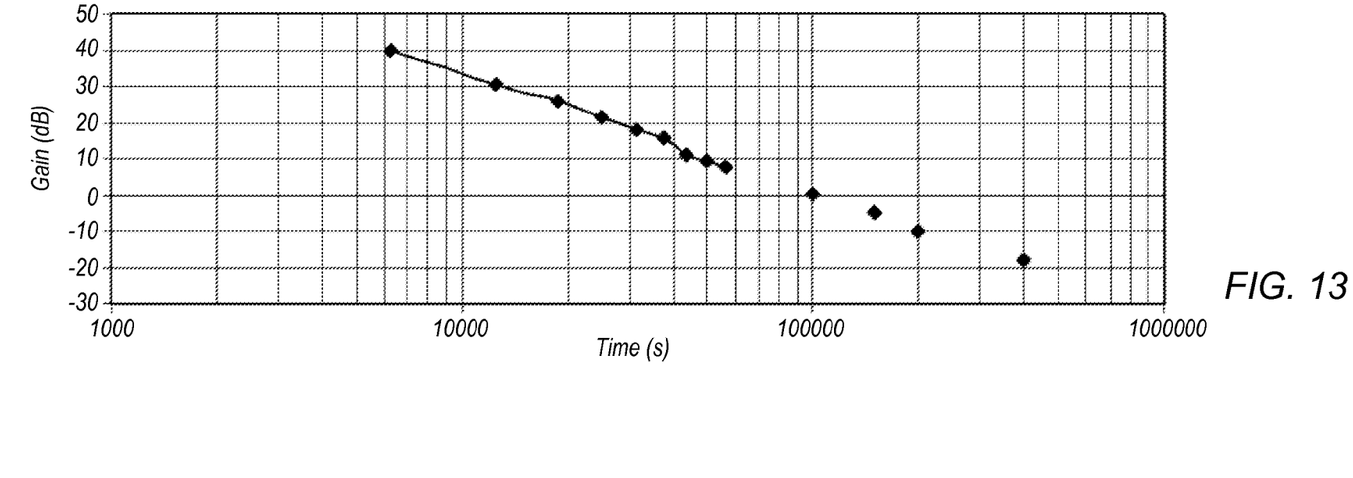
FIG. 13 shows a Bode plot illustrating the gain of the power regulator plotted versus the frequency, according to one embodiment.
Figure 14:
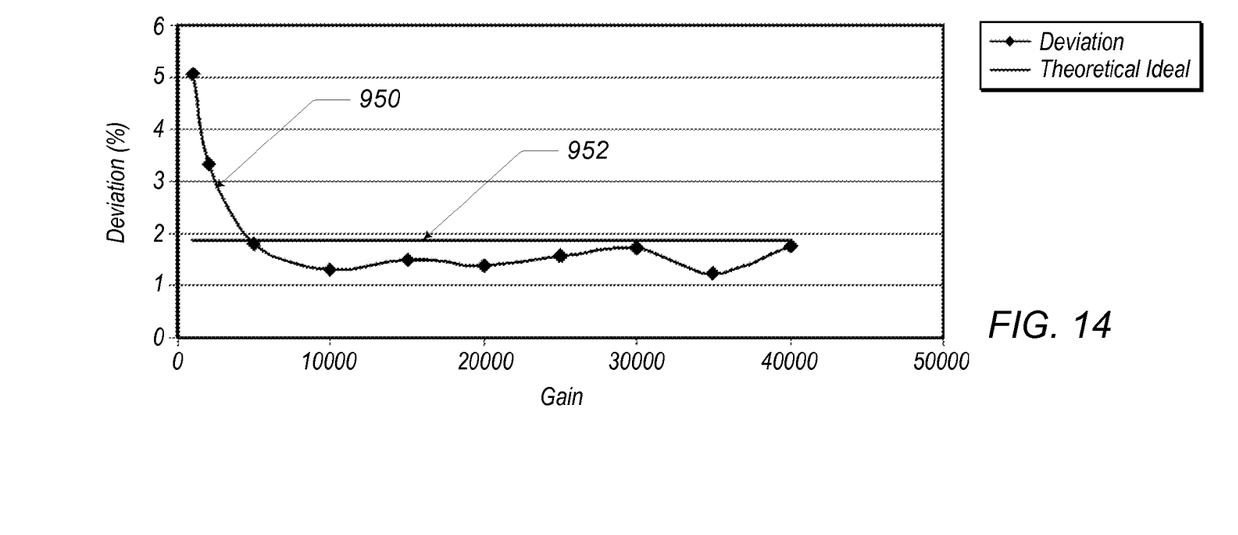
FIG. 14 shows a diagram plotting the output voltage deviation in percentage versus the gain of the power regulator, according to one embodiment.

FIG. 13 shows a Bode plot illustrating the gain plotted versus the frequency, according to one embodiment. As shown in the plot of FIG. 13, the gain decreases as frequency increases. The gain sensitivity, according to one embodiment, is illustrated by the diagram shown in FIG. 14, with the deviation in percentage (950) plotted versus the gain. The flat line 952 represents the theoretical ideal, for the illustrated embodiment. In one set of embodiments, when operating the Forc controller, the only parameter to be adjusted may be the gain. The transient response is shown to be relatively insensitive for a gain that is over 5000, as shown in FIG. 14. As mentioned above, the straight line 952 in the diagram represents the theoretical ideal transient response, while the curve 950 represents the actual deviation.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A system for controlling an output of a power regulator, the system comprising:
 a main control loop configured to generate an error signal based on:
  an output of the power regulator; and
  a reference signal;
  wherein the main control loop is further configured to generate a first control signal based on the error signal to control steady state behavior of the output of the power regulator; and
 a secondary control loop comprised within the main control loop, and configured to:
  generate a second control signal based on the error signal; and
  control transient response of the output of the power regulator using at least the second control signal.

2. The system of claim 1, wherein in generating the second control signal, the secondary control loop is configured to emulate a current-mode hysteretic control of the output of the power regulator according to the steady state behavior.

3. The system of claim 1, wherein the first control signal is configured to control generation of a digital pulse-width modulated (PWM) signal configured to power an output stage of the power regulator, wherein the output stage of the power regulator is configured to provide the output of the power regulator.

4. The system of claim 3, wherein the first control signal is configured to control a duty-cycle of the PWM signal.

5. The system of claim 3, wherein the second control signal is configured to shift the PWM signal.

6. The system of claim 5, wherein the output of the power regulator is configured to couple to an inductor;
 wherein the second control signal is configured to shift the PWM signal by an amount corresponding to a fraction of a ripple current generated in the inductor.

7. A method for controlling an output of a power regulator, the method comprising:
 generating an error signal based on the output of the power regulator and a reference voltage;
 generating a first control signal based on the error signal;
 controlling steady state behavior of the output of the power regulator using the first control signal;
 generating a second control signal based on the error signal; and
 controlling transient response of the output of the power regulator using the second control signal.

8. The method of claim 7;
 wherein said controlling the steady state behavior of the output of the power regulator comprises adjusting a first power signal configured to control an output stage of the power regulator; and
 wherein said controlling the transient response of the output of the power regulator comprises adjusting a phase of the first power signal.

9. The method of claim 8, wherein said adjusting the phase of the first power signal is performed instantaneously.

10. The method of claim 8, wherein the first power signal is a pulse-width modulated (PWM) signal;
 wherein said adjusting the first power signal comprises adjusting a duty-cycle of the PWM signal; and
 wherein said adjusting the phase of the first power signal comprises shifting the PWM signal.

11. The method of claim 8, wherein said adjusting the phase of the first power signal comprises:
 calculating a target count value based on a required phase shift for the first power signal and a net phase shift of the first power signal;
 counting cycle segments of a frequency of the first power signal; and
 toggling the first power signal when a current count value of said counting is greater than or equal to the target count value.

12. The method of claim 11, further comprising:
 subsequent to each instance of said toggling the first power signal, performing:
  recalculating the net phase shift based on the required phase shift, the current count value and the target count value;
  restarting said counting from an initial value; and
  toggling the first power signal when the current count value of said counting is greater than or equal to the target count value.

13. A method for performing hysteretic control on an output of a voltage regulator, the method comprising:
 inferring a current waveform corresponding to an unmeasured current developed in response to an output voltage provided at the output of the voltage regulator wherein said inferring is performed based at least on an established steady state behavior of the output of the voltage regulator;
 obtaining an error voltage based on the output voltage of the voltage regulator and a reference voltage; and
 adjusting an inductor current proportional to the error voltage, according to the inferred current waveform, wherein the inductor current is developed at least in response to the output voltage.

14. The method of claim 13, wherein said adjusting the inductor current comprises controlling the output voltage.

15. The method of claim 14, wherein said controlling the output voltage comprises:
 generating a first control signal from the error voltage, the first control signal having a fixed frequency; and
 controlling the output voltage using the first control signal.

16. The method of claim 14, wherein said adjusting the inductor current further comprises shifting the first control signal according to the inferred current waveform.

17. The method of claim 16, wherein said shifting the first control signal comprises:
 generating a second control signal from the error voltage, according to the inferred current waveform; and
 shifting the first control signal using the second control signal.

18. The method of claim 16, wherein said shifting the first control signal comprises shifting the first control signal by a specified amount that corresponds to a value of the error voltage and is determined from a slope of the inferred current waveform.

19. A voltage regulator comprising:
    a power stage configured to provide a regulated output voltage; and
    a control stage configured to:
        generate a pulse-width-modulated (PWM) signal that controls the power stage and therefore a value of the regulated output voltage;
        determine a duty-cycle value of the PWM signal based on a reference voltage and the regulated output voltage; and
        phase shift the PWM signal according to an inferred slope of an unmeasured current developed responsive to the regulated output voltage.

20. The voltage regulator of claim 19, wherein the control stage comprises:
    a summing block configured to generate an error voltage based on the reference voltage and the regulated output voltage;
    a steady-state control block configured to control the duty-cycle of the PWM signal based on the error voltage; and
    a transient control block configured to phase shift the PWM signal based on the error voltage and the inferred slope of the unmeasured current.

\* \* \* \* \*